March 24, 1925.

C. W. STEEN 1,531,152

CONDUIT TERMINAL BOX

Original Filed March 24, 1920  2 Sheets-Sheet 1

Inventor
C. W. Steen
by
Attorney

March 24, 1925. 1,531,152

C. W. STEEN

CONDUIT TERMINAL BOX

Original Filed March 24, 1920    2 Sheets-Sheet 2

Inventor
C. W. Steen
by
Attorney

Patented Mar. 24, 1925.

1,531,152

UNITED STATES PATENT OFFICE.

CHARLES W. STEEN, OF NORWOOD, OHIO, ASSIGNOR TO ALLIS-CHALMERS MANUFACTURING COMPANY, OF MILWAUKEE, WISCONSIN, A CORPORATION OF DELAWARE.

CONDUIT TERMINAL BOX.

Application filed March 24, 1920, Serial No. 369,049. Renewed February 2, 1925.

*To all whom it may concern:*

Be it known that CHARLES W. STEEN, a citizen of Norway, residing at Norwood, in the county of Hamilton and State of Ohio, has invented a certain new and useful Improvement in Conduit Terminal Boxes, of which the following is a specification.

This invention relates to conduit terminal boxes and may be applied to various forms of electrical apparatus. The invention is particularly adapted to terminal boxes for utilization in connection with electric motors which are customarily provided with leads by the manufacturer, connectible to service or other conductors.

One of the objects of the invention is the provision of a terminal box which may be readily applied to electrical apparatus and conveniently manipulated. Another object is the provision of a terminal box which may be cheaply and expeditiously manufactured.

Still another object of the invention is the provision of a terminal box structure having flexibility and adaptability of utilization so that it may be applied and used in a variety of modes, as desired.

A further object of the invention is the provision of a conduit terminal box wherein, when the cover thereof is removed, the conductors will be readily accessible. Other objects will appear hereinafter as the description of the invention proceeds.

The novel features of this invention will appear from the specification and the accompanying drawings forming a part thereof and disclosing several embodiments of the invention, and all these novel features are intended to be pointed out in the claims.

Figure 1:
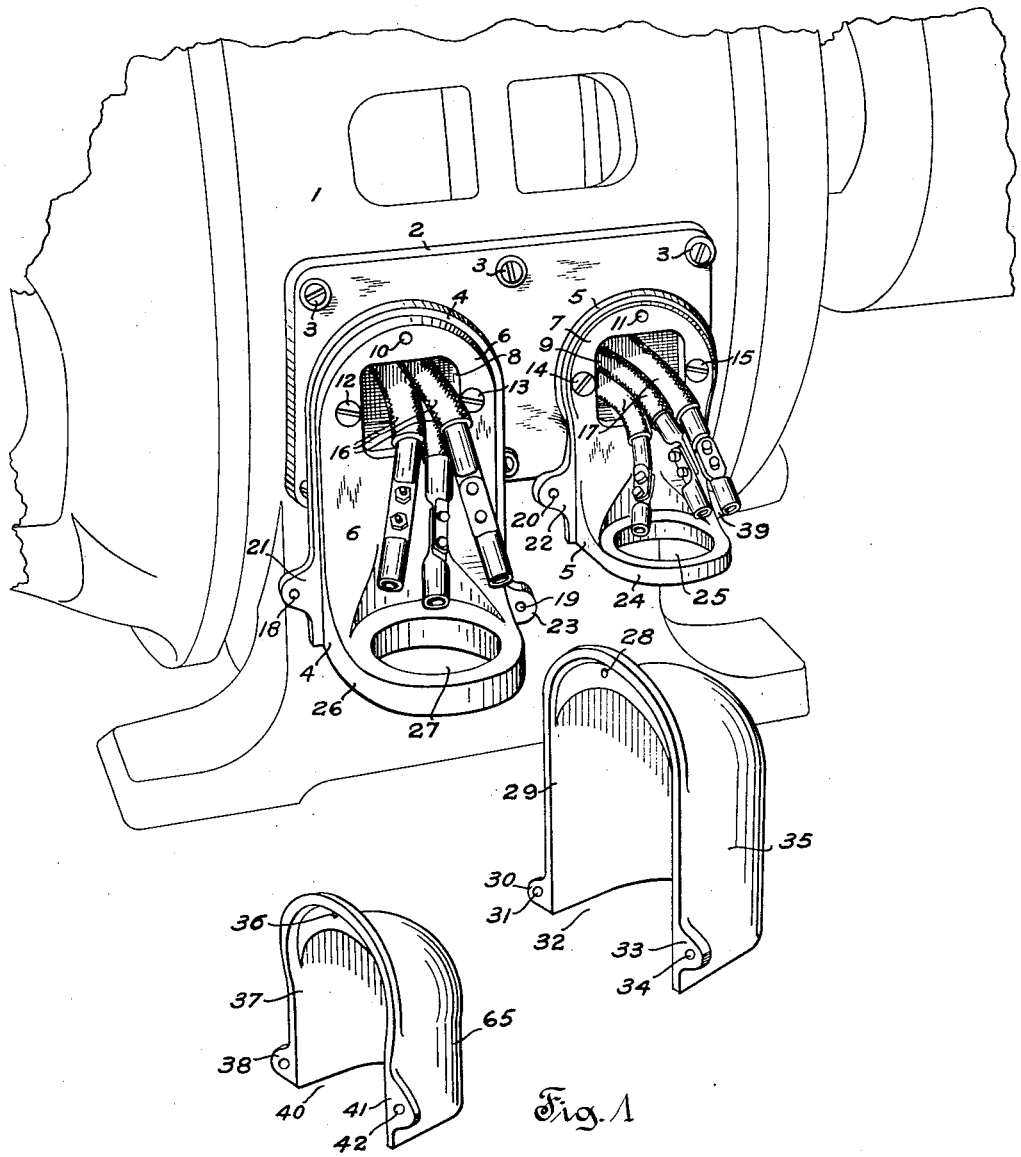
Fig. 1 shows a perspective view of a terminal box construction, applied to a motor, some of the parts being disassembled for the sake of clearness.

In Fig. 1 a base plate 2 having openings is shown as mounted on a motor housing 1 and fastened thereto by means of screws 3. The motor in question is of the type having both primary and secondary leads as occurs in induction motors of the wound rotor type, but in this instance the secondary leads are also carried through the housing. The primary leads 16 and secondary leads 17 pass through openings in the base plate 2 respectively. What may be termed an intermediate member 4 has a base portion 6 mountable on the base plate 2 and may be fastened thereto by means of screws 12, 13. The base portion 6 has an opening 8 therein cooperable with one of the openings in the base plate 2. The intermediate member is also provided with a portion 26 transverse to the base portion and is provided with an opening 27 with which any desired form of conduit may cooperate. A cover member 35 for the terminal box has an open side 29 formed to fit the shape of the base portion 6 of the intermediate member. The cover member has another open side 32 which is formed to fit the shape of the transverse portion 26 of the intermediate member. The cover member is further provided with ears 30, 33 which are adapted to cooperate with the ears 23, 21 respectively on the base portion 6. The cover member may be fastened to the base portion by means of screws passing through the holes 28, 31, 34 registerable with threaded holes 10, 19, 18 respectively.

In view of the fact that the secondary leads 17 are usually smaller than the primary leads 16, smaller conduits are permissible and thus the smaller intermediate member in general is needed. While the intermediate member 5 is in general smaller than the intermediate member 4, the opening 9 therein cooperable with an opening in the base plate 2 is made of substantially the same size as the opening 8 in the intermediate member 4 and the screw holes for screws 14, 15 may be made the same distance apart as those for screws 12, 13 so that the intermediate members 4, 5 may be interchanged if that is found desirable. The intermediate member 5 also has a base portion 7 and a transverse portion 24, the latter having an opening 25 with which any desired form of conduit may cooperate. A cover member 65 for the intermediate member 5 has open sides 37 and 40 adapted to cooperate with the intermediate member 5 in a manner similar to the cover member 35 with its intermediate member. The cover member 65 may be fastened to the intermediate member through the means of the ears 38, 41 and 39, 22 in cooperation with screws passing through the holes 36—11; 42—20; etc.

Figures 3, 4:
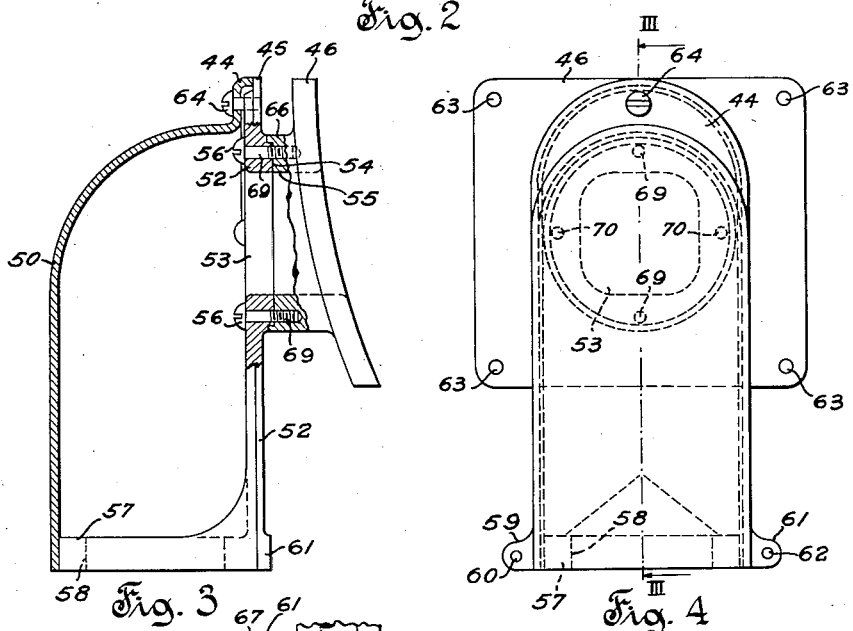
Fig. 3 is a partial section along the line III—III of Fig. 4, the latter figure showing an end elevation of one of the conduit terminal boxes shown in Fig. 2.
Figure 5:
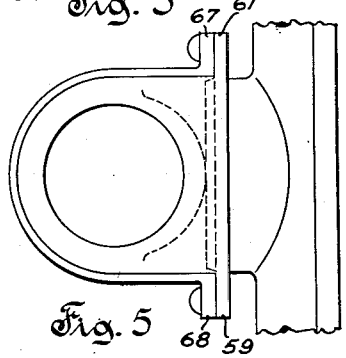
Fig. 5 is a bottom view of the terminal box shown in Fig. 4.

It will be observed that by reason of the construction of the intermediate members and the cover members that when the latter are removed, maximum accessibility to the electrical connections is provided for. The boxes may, moreover, be turned in any desired direction, as down, sideways or up, since the screws holding the intermediate members to the base plate may cooperate with sets of holes 90 degrees apart as clearly shown in Fig. 4. Either of the boxes may, if desired, be omitted and a cover plate substituted.

Figure 2:
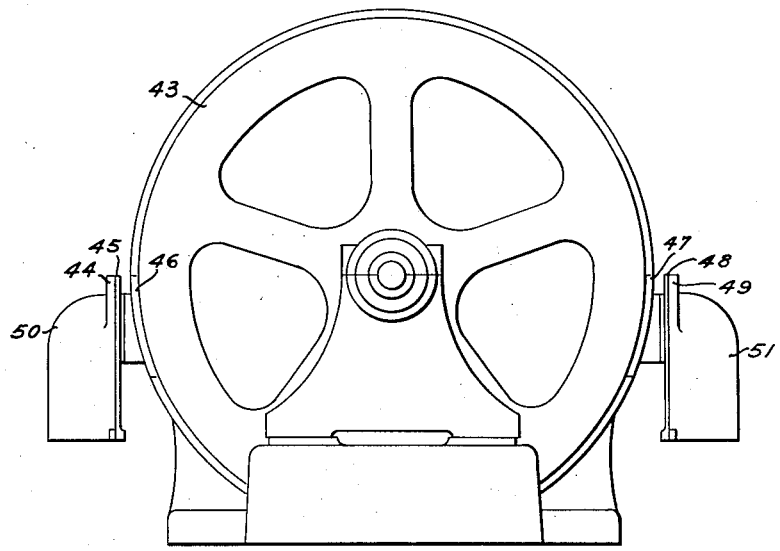
Fig. 2 is a side elevation of a motor showing a modified manner in which the conduit terminal box construction may be applied.

In Fig. 2 a motor 43 is shown provided with a base plate 46, 47 at both ends thereof thus providing for the use of a terminal box at each end of the motor, which at times becomes desirable. The terminal boxes comprise intermediate members 45, 48 and cover members 50, 51. The left hand terminal box is shown in greater detail in Fig. 3. The base plate 46 is here shown as provided with a boss 66 bounding an opening 55 in the base plate. The base portion 52 of the intermediate member 45 is mountable upon the boss 66 so as to seat in an annular recess 54 in the boss. The base portion 52 is provided with an opening 53 cooperating with the opening 55 in the base plate. The base portion 52 may be fastened to the boss by means of screws 56 cooperable either with the set of screw holes 69, or set 70 in the base plate 46, as may be seen in Fig. 4. The intermediate member is also provided with a transverse portion 57 having an opening 58 with which any desired form of conduit may cooperate. The cover member 50 has a flange 44 through which a screw 64 may pass into a flange on the intermediate member 45. The cover member is also provided with ears 67, 68 cooperable with ears 61, 59 respectively on the intermediate member, the usual screw holes 60, 62 being provided in the ears.

It should be understood that it is not desired to limit the invention claimed to the exact details of construction shown and described, for obvious modifications may occur to persons skilled in the art.

It is claimed and desired to secure by Letters Patent:

1. A conduit terminal box for electrical apparatus comprising a member constituting two complete plane walls of the box each wall having an opening, and a cover member constituting the remaining walls of said box.

2. A conduit terminal box for electrical apparatus comprising a plate having an opening, an intermediate member having a portion constituting a wall of said box, means whereby said intermediate member may be mounted on said plate and over said opening, said member having another portion constituting a single complete plane wall of said box and extending transversely of said other wall, and a cover member detachably mounted over said intermediate member and constituting the remaining walls of said box.

3. A conduit terminal box for electrical apparatus comprising a ring adapted to receive a conduit in its opening, a wall member integral with said ring and extending transversely to the general plane of said ring, said member having a width substantially the same as the external diameter of said ring, and a cover member constituting the remaining walls of said box.

In testimony whereof, the signature of the inventor is affixed hereto.

C. W. STEEN.